Jan. 8, 1952
H. A. BROOS
2,582,100
REFLEX AMPLIFIER CIRCUIT FOR RADIO RECEIVERS
Filed April 29, 1946
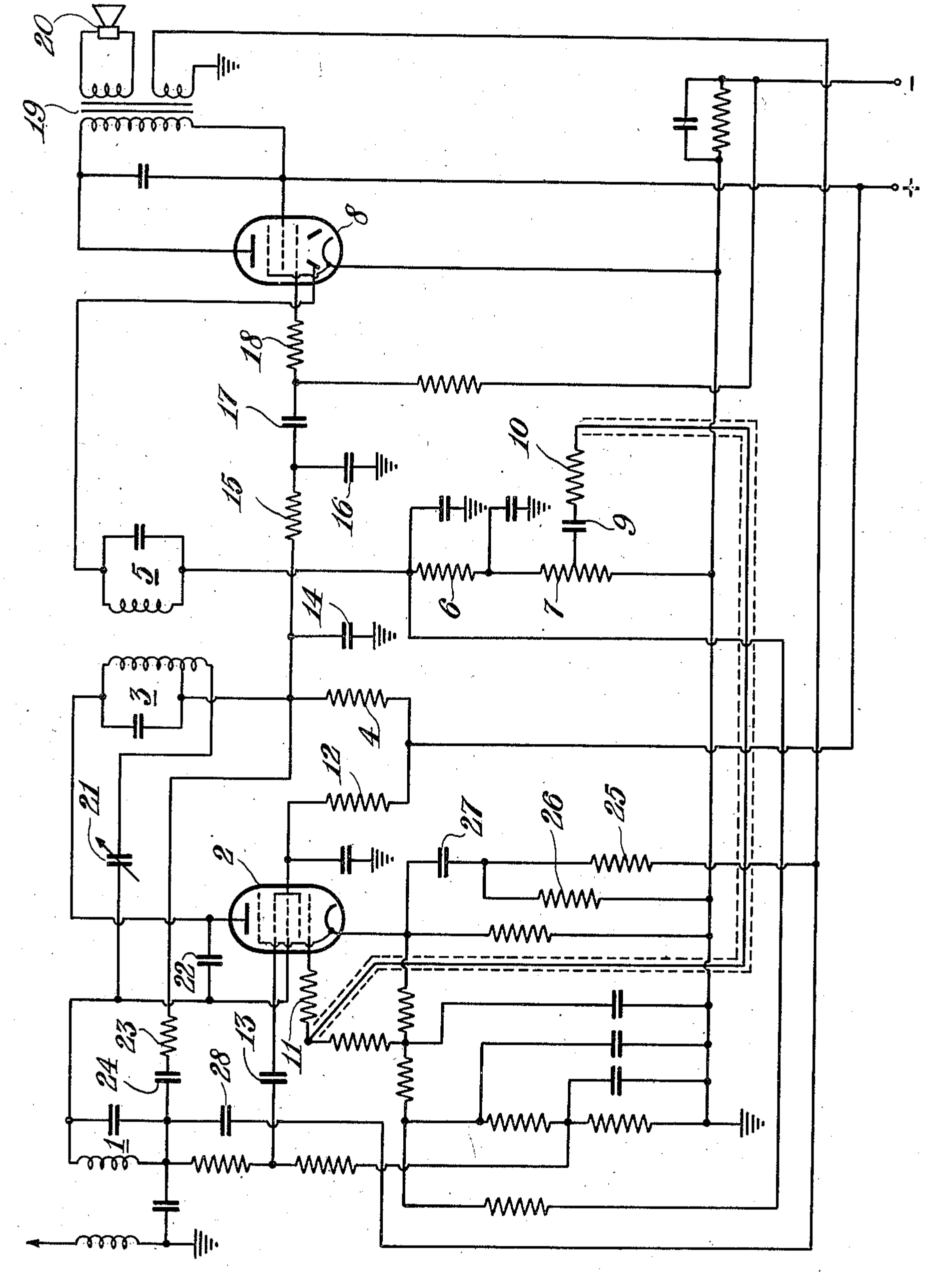
HENRICUS ADRIANUS BROOS.
INVENTOR.
BY
ATTORNEY.

Patented Jan. 8, 1952

2,582,100

UNITED STATES PATENT OFFICE 2,582,100

REFLEX AMPLIFIER CIRCUIT FOR RADIO RECEIVERS

Henricus Adrianus Broos, Eindhoven, Netherlands, assignor to Hartford National Bank and Trust Company, Hartford, Conn., as trustee Application April 29, 1946, Serial No. 665,663
In Belgium March 3, 1945

Section 1, Public Law 690, August 8, 1946
Patent expires March 3, 1965

4 Claims. (Cl. 250—20)

The present invention relates to an amplifier circuit arrangement, and more particularly, to a reflex amplifier wherein high frequency or intermediate frequency signals and low frequency oscillations derived therefrom are amplified.

Such a reflex circuit-arrangement is frequently used in radio-receivers. However, reflex circuits have various detrimental properties which are, in general, due to non-linear characteristic curves of the discharge tubes used.

Thus, for example, much distortion is caused by the fact that the high-frequency signal or the intermediate-frequency signal is modulated with the low-frequency oscillations. Furthermore the high-frequency or the intermediate-frequency signal supplied to the discharge tube is detected which, particularly in the case of strong signals, involves a low-frequency or rest signal which occurs at the output terminals of the circuit even if the low-frequency input signal of the reflex stage is reduced to zero. The presence of a rest signal is generally considered to be undesirable, the more so because this signal, as a rule, is strongly distorted.

The aforesaid drawbacks would occur to an even greater extent if it should be desired to control the amplification of the reflex stage. For such a control it would be necessary to employ a discharge tube having a markedly curved characteristic. This is why hitherto automatic gain control has not yet been used in a reflex stage.

In order to minimise the distortion resulting from modulation, the discharge tube should have supplied to it a low-frequency signal having as small an amplitude as possible and at the same time should provide a maximum low-frequency amplification. For this latter qualification the resistance in the tube anode circuit should be a maximum. These measures, however, tend to increase the distortion produced by the rest signal because the rest signal is likewise subjected to high amplification. If, however, the rest signal is suppressed by reducing the amplification of the reflex stage, the low-frequency input signal must be increased, as a consequence of which the modulation distortion becomes too strong.

The principal object of the present invention is to provide an arrangement in which the rest signal may be considerably attenuated or even practically completely suppressed, while the distortion due to the modulation of the high-frequency or the intermediate-frequency signal by the low-frequency oscillations remains small. A further object of the invention is to permit the use of gain control, particularly automatic volume control, in a reflex amplifier arrangement.

According to the invention, sufficient low-frequency negative feedback is provided in the said circuit-arrangement to suppress the low-frequency oscillations generated by detection of high-frequency or intermediate-frequency signals due to the non-linear tube characteristic.

Moreover, use is preferably made of negative feedback of the low-frequency amplification of the discharge tube. It is frequently possible to combine the two negative feedbacks.

The best results are achieved by using a multi-grid-discharge tube in which the low-frequency oscillations are supplied, for pre-amplification, to the first control-grid and the pre-amplified oscillations are supplied, preferably jointly with the high-frequency or the intermediate-frequency signals, to a second control-grid. The pre-amplified oscillations may be derived, for example, from a screen-grid circuit. By such a cascade circuit-arrangement the low-frequency amplification can be raised to a high level, so that, when using the present invention, the low-frequency negative feedback can also acquire a high value. As a result the said distortions can be minimized.

In order that the invention may be clearly understood and readily carried into effect, it will now be described more fully with reference to the accompanying drawing, given by way of example.

The sole figure represents the intermediate-frequency and the low-frequency amplification stages of a radio-receiver in which use is made of the invention. The intermediate-frequency signal is supplied inductively to a resonant circuit 1, which is tuned to the frequency of the intermediate-frequency signal, and supplied to the third grid of a discharge tube 2 for amplification.

The anode circuit of this tube includes the series connection of a resonant circuit 3, which is tuned to the intermediate-frequency signal, and a resistance 4. The amplified intermediate-frequency oscillations are taken from the circuit 3 which, for this purpose, is magnetically coupled with a second intermediate-frequency circuit 5 which is connected in series with a resistance 6, a potentiometer 7 and to one of the diodes of a duodiode-final pentode 8. The second diode of this discharge tube is not used in the circuit.

The low-frequency oscillations obtained by rectification in the circuit of the diode are taken from the potentiometer 7 through the series-connection of a condenser 9 and a resistance 10 and supplied, through a shielded conductor and a resistance 11, to the first grid of the discharge tube 2 used in the reflex circuit.

The low-frequency oscillations are amplified by the tube 2 in two stages. For this purpose the screen-grid circuit of this tube comprises a resistance 12 which is not shunted as far as low-frequencies are concerned, and across which appear the preamplified low-frequency oscillations. These oscillations are transmitted, by means of a condenser 13, to the third grid of the heptode 2. The low-frequency oscillations amplified in cascade are derived from the resistance 4 and transmitted to the control grid of the pentode 8 via a filter. This filter consists of two condensers 14 and 16, a resistance 15, a blocking condenser 17 and a resistance 18. The anode circuit of the pentode 8 includes a low-frequency transformer 19. This transformer has two secondary windings; one winding is connected to a loundspeaker 20, the other winding supplying a voltage suitable for the negative feedback, which will be described hereinafter.

The screen grid of the tube 2 is grounded, as far as intermediate frequency oscillations are concerned, by means of a by-pass condenser. Between the third grid of this discharge tube and the bottom end of the coil associated with the intermediate-frequency circuit 3 is connected a neutralizing condenser 21. The condenser associated with the circuit 3 is connected to a tapping of the said coil. In order to facilitate the adjustment of the neutralizing condenser 21, the tube capacity $C_{ag3}$ is artificially raised by using a small condenser 22. The use of this condenser provides the further advantage; that the tolerance of the tube capacity $C_{ag3}$ is increased. The neutralization as described is desired in view of the intermediate frequency (468 kc./s.) chosen in order to avoid self-oscillation of the circuit.

Owing to the curvature of the characteristic curve of the tube 2, two kinds of distortion occur. The intermediate-frequency signal is modulated with the low-frequency oscillations and the signal is, moreover, detected due to which, particularly in the case of strong signals, a distorted low-frequency voltage appears across the resistance 4. This distorted low-frequency voltage or rest signal even occurs when the first grid of the tube has no low-frequency oscillations supplied to it as when the potentiometer 7 is adjusted to its bottom position.

In order to minimize the first-mentioned distortion, it is consequently necessary to minimize the amplitude of the low-frequency oscillations supplied to the first grid of tube 2. As a result, the low-frequency amplification of the reflex stage must be greatly increased and the resistance 4 must have a high value. As a consequence thereof, the rest signal and the distortion inherent to this signal acquire an undue value. If, however, one should want to suppress this distortion by reducing the amplification of the reflex stage, the low-frequency input signal should be accentuated, owing to which the first-mentioned distortion becomes too strong.

According to the invention the rest signal and the distortion due to it are suppressed without the intermediate-frequency signal being modulated by the low-frequency oscillations to an undue extent. This is accomplished by providing negative feedback of the low-frequency oscillations generated by detection of the intermediate-frequency signal in the reflex stage.

For this purpose the junction of the resonant circuit 3 and the resistance 4 is connected in this circuit-arrangement, through the series connection of a resistance 23 and a condenser 24, to the bottom side of the intermediate-frequency resonant circuit 1. The use of this negative feedback permits a high amplification in the reflex stage and thus a comparatively weak low-frequency input signal suffices, without the distortion caused by the rest signal assuming an undue value.

The use of the previously described cascade amplification of the low-frequency oscillations ensures a very strong low-frequency amplification which permits the low-frequency amplifying tube to be coupled back negatively. The voltage required therefor is taken from the second secondary winding of the transformer 19. By means of two resistances 25 and 26 and a coupling condenser 27 this voltage is supplied to the cathode and, through a coupling condenser 28, to the third grid of tube 2. By this negative feedback not only the distortion caused by tube 2 but also the distortion initiated in the tube 8 and the low-frequency transformer 19, is coupled back negatively. A suitable choice of the capacity of the coupling condenser 28 in the previously described feedback circuit ensures that the higher frequencies of the low-frequency oscillations are coupled back negatively more than the lower frequencies. This is required to ensure a faithful sound reproduction.

In one practical form of construction of the circuit-arrangement as described, the first-mentioned negative feedback amounted to a factor 20, while the last-mentioned negative feedback amounted to a factor 6.5. In all the low-frequency amplification was negatively coupled back 130 times. As the total low-frequency amplification, owing to the cascade circuit-arrangement without negative back-coupling, was 1300 fold, a tenfold low-frequency amplification remained. The distribution of the negative feedback among two different paths aids in avoiding amplifier instability. This instability often occurs if the total negative feedback is used at once from the output to the input of the amplifier.

The present circuit-arrangement has the additional advantage that automatic gain control can be used with the reflex amplifier tube 2. For this purpose a control voltage is taken from the resistance 6; this voltage is supplied to the first and the third grid of tube 2 after having been smoothed by means of a filter consisting of resistances and condensers. In the conventional reflex circuits such a gain control is not possible, since in this case the reflex tube must have a linear characteristic curve. The form of construction described permits control of both the intermediate-frequency signal and the low-frequency oscillations by a factor of 3. This control is preferably used in combination with automatic gain control of the mixing tube. The voltage required for this purpose may, for example, be taken from the peak of the potentiometer 7. The circuit may also be slightly modified, by taking the low-frequency voltage for the pentode 8 not from the resistance 4 but from the resistance 12. In this case the low-frequency negative feedback through the second secondary winding of the transformer 19 to the third grid of tube 2 may be omitted.

What I claim is:

1. A reflex amplifier comprising an electron discharge tube having in the order named, a cathode, a first control grid, an auxiliary electrode, a second control grid and an output electrode, means to apply a modulated high frequency signal voltage to said second control grid, detector means coupled to said output electrodes to produce a low frequency modulation voltage, means to apply said modulation voltage to said first control grid, a modulation voltage load impedance element coupled to said auxiliary electrode, means to couple said load impedance element to said second control grid, means to apply said modulation voltage in negative feedback relationship to said second control grid, and a modulation voltage utilization circuit coupled to said output electrode.

2. A reflex amplifier comprising an electron discharge tube having in the order named, a cathode, a first control grid, an auxiliary electrode, a second control grid and an output electrode, means to apply a modulated high frequency signal voltage to said second control grid, detector means coupled to said output electrode to produce a low frequency modulation voltage, means to apply said modulation voltage to said first control grid, a modulation voltage load impedance element coupled to said auxiliary electrode, means to couple said load impedance element to said second control grid, a modulation voltage utilization circuit coupled to said output electrode, and means coupled to said utilization circuit to apply said modulation voltage in negative feedback relationship to said second control grid.

3. A reflex amplifier comprising an electron discharge tube having in the order named, a cathode, a first control grid, an auxiliary electrode, a second control grid and an output electrode, means to apply a modulated high frequency signal voltage to said second control grid, detector means coupled to said output electrode to produce a low frequency modulation voltage, means to apply said modulation voltage to said first control grid, a first modulation voltage load impedance element coupled to said auxiliary electrode, means to couple said load impedance element to said second control grid, a second modulation voltage load impedance element coupled to said output electrode, means to couple said second impedance element to said second control grid to apply said modulation voltage in negative feedback relationship to said second control grid, a modulation voltage utilization circuit coupled to said second impedance element, and means coupled to said utilization circuit to apply said modulation voltage in negative feedback relationship to said second control grid and to said cathode.

4. A reflex amplifier comprising an electron discharge tube having in the order named, a cathode, a first control grid, an auxiliary electrode, a second control grid and an output electrode, means to apply a modulated high frequency signal voltage to said second control grid, detector means coupled to said output electrode to produce a low frequency modulation voltage, means to apply said modulation voltage to said first control grid, a modulation voltage load impedance element coupled to said auxiliary electrode, means to couple said load impedance element to said second control grid, means to apply said modulation voltage in negative feedback relationship to said second control grid, means coupled to said detector means to produce a control potential having a value proportional to the amplitude of said signal voltage, and means to apply said control potential to said second control grid.

HENRICUS ADRIANUS BROOS.

REFERENCES CITED

The following references are of record in the file of this patent:

UNITED STATES PATENTS

| Number | Name | Date |
|---|---|---|
| 2,005,789 | Koch | June 25, 1935 |
| 2,055,992 | Yolles | Sept. 29, 1936 |
| 2,058,512 | Rust et al. | Oct. 27, 1936 |
| 2,201,365 | Case | May 21, 1940 |
| 2,205,243 | Dome | June 18, 1940 |
| 2,234,691 | Dome | Mar. 11, 1941 |
| 2,269,249 | Bruck | Jan. 6, 1942 |
| 2,452,340 | Van Der Heem | Oct. 26, 1948 |

FOREIGN PATENTS

| Number | Country | Date |
|---|---|---|
| 443,191 | Great Britain | Feb. 24, 1936 |
| 863,009 | France | Mar. 21, 1941 |